United States Patent [19]
Akiyama

[11] Patent Number: 5,166,805
[45] Date of Patent: Nov. 24, 1992

[54] DISK PLAYER WITH A BLANKING DURING FAST SCANNING

[75] Inventor: Toru Akiyama, Saitama, Japan

[73] Assignee: Pioneer Electronic Corporation, Tokyo, Japan

[21] Appl. No.: 488,385

[22] Filed: Feb. 23, 1990

Related U.S. Application Data

[63] Continuation of Ser. No. 236,265, Aug. 24, 1988, abandoned, which is a continuation of Ser. No. 875,811, Jun. 18, 1986, abandoned.

[30] Foreign Application Priority Data

Jun. 18, 1985 [JP] Japan .................. 60-92036[U]

[51] Int. Cl.⁵ .................. H04N 5/93; G11B 7/085
[52] U.S. Cl. .................. 358/342; 369/32; 369/54; 369/58
[58] Field of Search .................. 358/310–311, 358/314–315, 327, 335, 336, 342, 907, 33, 165; 360/14.1, 33.1, 38.1, 78.04; 369/32, 44, 50, 53, 54, 58, 111, 44.28

[56] References Cited

U.S. PATENT DOCUMENTS

| | | | |
|---|---|---|---|
| 4,015,076 | 3/1977 | Ishiodori | 358/340 X |
| 4,017,678 | 4/1977 | Baker | 358/342 X |
| 4,193,084 | 3/1980 | Yamagiwa et al. | 358/315 X |
| 4,198,650 | 4/1980 | Hongu et al. | 358/315 X |
| 4,260,858 | 4/1981 | Beiser | 369/111 X |
| 4,286,290 | 8/1981 | Pyles et al. | 358/340 X |
| 4,387,407 | 6/1983 | Wine | 358/342 |
| 4,484,174 | 11/1984 | Wilber et al. | 358/342 X |
| 4,490,752 | 12/1984 | Machida et al. | 358/342 |
| 4,558,375 | 12/1985 | Sontheimer | 369/50 X |
| 4,567,534 | 1/1986 | Groen et al. | 358/342 |
| 4,680,744 | 7/1987 | Kanamaru | 369/58 X |
| 4,685,098 | 8/1987 | Yoshida | 369/58 X |
| 4,688,203 | 8/1987 | Koishi et al. | 369/58 X |
| 4,694,456 | 9/1987 | Morita et al. | 360/38.1 X |
| 4,698,695 | 10/1987 | Kosaka et al. | 369/58 X |
| 4,751,693 | 6/1988 | Yoshimaru | 369/111 X |

OTHER PUBLICATIONS

Service Manual for "Laser Disc Player VP-1000", pp. 34, 35 and 37, published by Pioneer Electronic Corporation, May 1980.

Technical Information LD-700, LD-v4000, Pioneer Electronic Corp., Jan. 1985.

*Primary Examiner*—Wayne R. Young
*Attorney, Agent, or Firm*—Sughrue, Mion, Zinn, Macpeak and Seas

[57] ABSTRACT

In a disk player that provides a fast scanning mode in which only selected tracks are tracked by a playback head under closed loop control, a circuit for eliminating the image signal when adjacent tracks have uncorrelated images and the head is under open loop control.

9 Claims, 2 Drawing Sheets bump # DISK PLAYER WITH A BLANKING DURING FAST SCANNING

This is a continuation of application Ser. No. 07/236,265, filed Aug. 24, 1988, which is a continuation of application Ser. No. 875,811 filed Jun. 18, 1986, both now abandoned.

BACKGROUND OF THE INVENTION

1. Field of the Invention

This invention relates to a disk player typically used for a video disk.

2. Background Art

In the case of, for example, a video disk player, a desired picture sequence can be scanned in a fast mode while a playback image is viewed by moving a pickup in the radial direction of the disk at a speed higher than that at the time of normal playback. During the scanning, a tracking servo loop is set open for a fixed interval of time (e.g., between 5 to 10 ms) as shown in FIG. 5 and a pickup is moved in the radial direction of the disk at a speed higher than that at the time of normal playback to make the disk cross several hundred tracks. Then the tracking servo loop is closed at a subsequent fixed interval and the pickup is caused to follow the one track. Thereafter, the above operations are repeated.

If the above scanning is carried out in the conventional apparatus, the video signal, as it is, will be supplied to a CRT when the tracking servo loop is opened, as well as when the loop is closed. As a consequence, if the disk is, for example, a CLV (Constant Linear Velocity) disk, noise will appear on a picture plane because synchronizing signals in video format signals on tracks adjacent to each other are not correlated. The thus generated noise will spoil the view. When the locked picture plane with a fixed color is scanned as proposed by the present inventors (Japanese Utility Model Application 115082/84), the noise becomes conspicuous in particular and the disadvantage is that the commercial value of the operation is extremely reduced.

SUMMARY OF THE INVENTION

Accordingly, an object of this invention is to eliminate the above described problem of noise in special scanning.

The disk player of the present invention performs special playback by moving a playback in the radial direction and causing the playback to jump over a plurality of tracks. The disk player comprises a demodulating circuit for demodulating a received video signal, an eliminating circuit for eliminating image data contained in the demodulated video signal produced by the demodulating circuit and control means for controlling the eliminating, circuit according to the correlation between the synchronizing signals over the tracks. According to the invention, at the time of the special playback, the demodulated signal is generated unchanged when the synchronizing signals in video format signals on the tracks adjacent to each other are correlated. However, the image data is removed from the demodulated signal when the synchronizing signals in video format signals on adjacent tracks are not correlated. As a result, an image of good quality is obtained by preventing the transient jumping image signal from appearing on the picture plane in the form of noise.

DETAILED DESCRIPTION OF THE PREFERRED EMBODIMENTS

Figure 1:
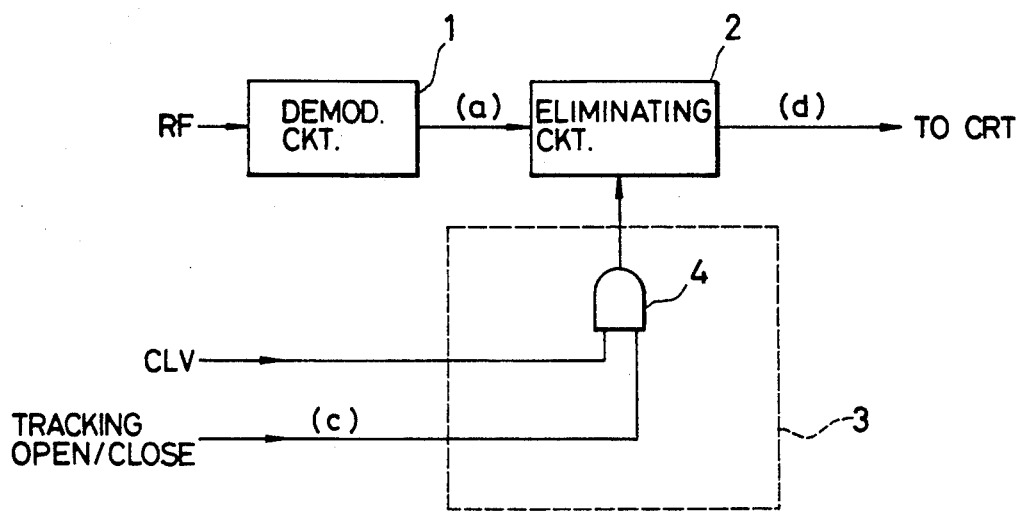
FIG. 1 is a block diagram of a disk player embodying the present invention.

FIG. 1 is a block diagram of a disk player embodying the present invention. In FIG. 1, there is shown a circuit including a demodulating circuit 1 for demodulating a video signal received as an RF signal. An eliminating circuit 2 receives the demodulated signal produced by the demodulating circuit 1 and produces the signal with or without eliminating the image signal. A control circuit 3 controls the operation of the eliminating circuit 2 and includes an AND gate 4 whose one input receives a CLV signal having a high level when a CLV (constant linear velocity) disk is mounted. The other input of the AND gate 4 receives a loop control signal having a high level when a tracking servo loop for the pickup is opened. The CLV signal and the loop control signal are supplied by a control device such as a microcomputer (not shown).

Figure 3:
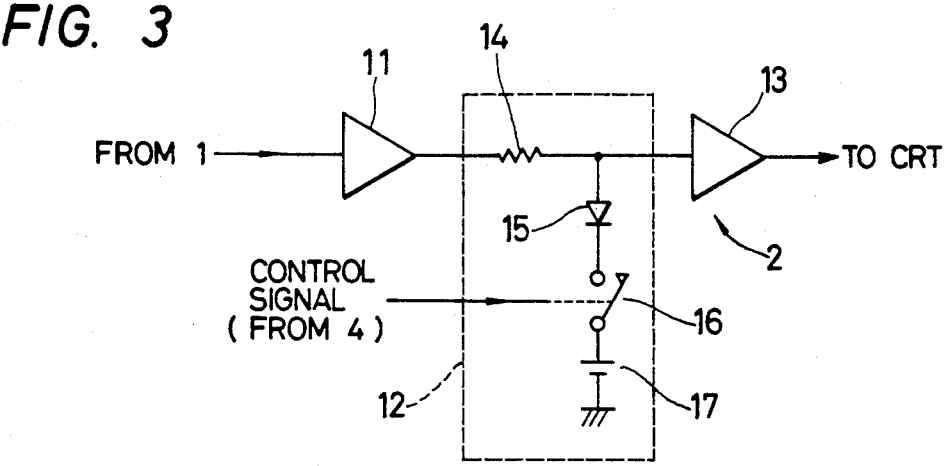
FIG. 3 is a circuit diagram of the eliminating circuit of FIG. 1.

FIG. 3 shows an eliminating circuit 2 embodying the present invention. The output signal of the demodulating circuit 1 is supplied through an input buffer amplifier 11 to a clamp circuit 12 and then to an output buffer amplifier 13. The clamp circuit 12 is a series circuit which comprises a resistor 14 connected in series between the buffer amplifiers 11 and 13, a diode 15 connected between the input terminal of the buffer amplifier 13 and ground, a switch 16 and a power supply 17 in the connection to ground.

Figure 2A:
FIGS. 2(a)-2(d) are waveform charts of the disk player of FIG. 1.

The operation of the disk player will now be described. Assuming that a CLV disk is mounted and being replayed, the control device detects the type of the disk and supplies the CLV signal at a high level to one input terminal of the AND gate 4. On receiving a playback command, the control device moves the pickup in the radial direction of the disk at normal speed and closes the tracking servo loop and supplies to the other input terminal of the AND gate 4 a signal at a low level when the tracking servo loop is closed (FIG. 2(c)). Consequently, the output of the AND gate 4 is at a low level when the tracking servo loop is closed and inhibits the eliminating operation of the eliminating circuit 2. Thereby the demodulated signal (FIG. 2(a)) supplied by the demodulating circuit 1 is the same as the signal (FIG. 2(d)) supplied to the CRT (not shown). As the pickup is following the track (the level of a tracking error signal (FIG. 2(b) is low)), a normal playback picture is obtained and no noise appears thereon.

Figure 2B:
Figure 2C:
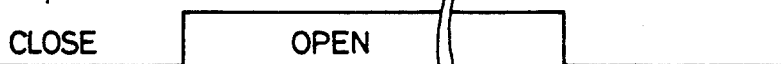
Figure 2D:

On the other hand, the output of the AND gate 4 is at a high level when a scanning command is received and the tracking servo loop is opened (so as to disregard the large tracking error signal in FIG. 2(b)) and the eliminating circuit 2 operates so as to eliminate the image signal from the received video signal and outputs an image-free signal.

Figure 4:
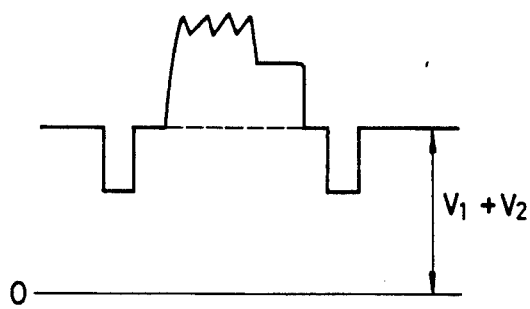
FIG. 4 is a waveform chart of the eliminating circuit.
Figure 5:
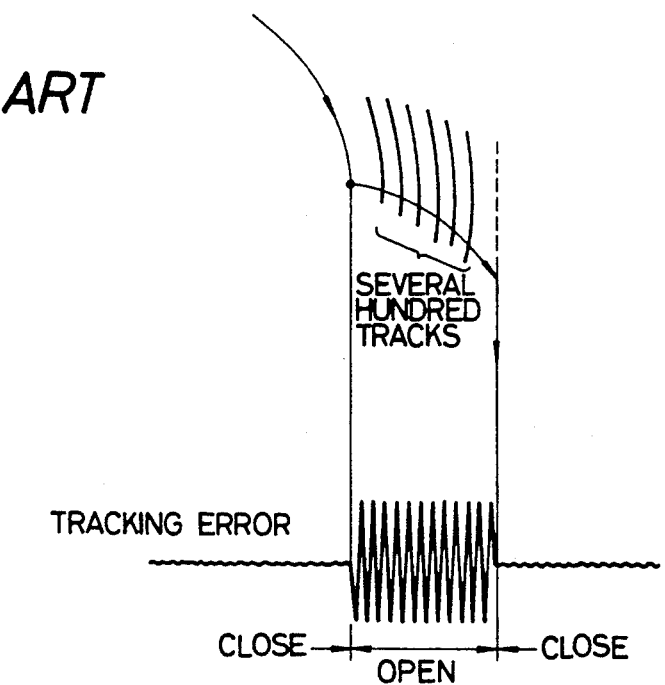
FIG. 5 is a explanatory diagram illustrating scanning in a conventional apparatus and the waveform chart thereof.

When the eliminating circuit 2 is so arranged as shown in FIG. 3, the switch 16 is turned on while the AND gate 4 is producing the signal at a high level. When the switch 16 is off, the video signal (horizontal synchronizing signal) supplied to the input buffer amplifier 11 is left unchanged and supplied through the resistor 14 to the output buffer amplifier 13. When the switch 16 is on, the diode 15 conducts and the potential of the buffer amplifier 13 is clamped at a potential which is the sum ($V_1 + V_2$), where the potential $V_1$ is the potential of the power supply 17 and the voltage $V_2$ is the forward voltage of the diode 15. The image signal is clamped at a black level as shown by a broken line of FIG. 4 and is practically eliminated. Thereby the input-signal of the eliminating circuit 2 shown in FIG. 2(a) produces an output signal shown in FIG. 2(d). A black image is thus displayed on the picture plane and no noise appears which would spoil the view.

When a CAV (Constant Rotation or Angular Velocity) disk is mounted, the CLV signal is at a low level and the output of the AND gate 4 is also at a low level. The operation of the eliminating circuit 2 is thus always inhibited and the demodulated signal supplied by the demodulating circuit 1 is supplied without being changed. In the case of the CAV disk which is different from the CLV disk, however, the positions of the horizontal synchronizing pulses on tracks adjacent to each other (each track containing one image signal) are aligned with each other in the form of a radial line. Since the image signals are correlated, the signals will not produce noise spoiling the view. Accordingly, if the image signal left unchanged is supplied rather than being clamped at a black level, it will form a good picture image.

Although it has been arranged that the image signal is clamped at a black level, the signal may be clamped at a level of another color such as white or gray as long as it is clamped at a level of fixed color.

The disk player performs special playback by moving a playback head in the radial direction and causing the playback head to jump over a plurality of tracks according to the present invention. The disk player comprises a demodulating circuit for demodulating a received video signal, an eliminating circuit for selectively eliminating image data contained in the video demodulated signal produced by the demodulating circuit and control means for controlling the eliminating circuit according to the correlation between the image data over the tracks. The invention is characterized in that, at the time of the special playback, the demodulated signal is generated unchanged when the synchronizing signals in video formal signals on the tracks adjacent to each other are correlated. However,. the image data is deleted, from the demodulated signal when the synchronizing signals in video format signals on adjacent tracks are not correlated. As a result, an image of good quality is obtained by preventing the jumping image signal from appearing on the picture plane in the form of noise. Accordingly, the present invention is particularly effective for a system wherein a fixed color is used or locking purposes during scanning.

What is claimed is:

1. A blanking circuit for a video disk player performing special playback by moving a head in the radial direction of a video disk and causing said head to jump over a plurality of tracks, said circuit comprising:

a demodulating circuit for demodulating a received video signal produced from said video disk;

control means responsive to a condition signal distinguishing between a constant angular velocity (CAV) disk and a constant linear velocity (CLV) disk for generating an elimination control signal; and eliminating means responsive to said elimination control signal for eliminating all image data contained in said demodulated video signal produced by said demodulating circuit.

2. A blanking circuit as recited in claim 1, wherein said condition signal further distinguishes between open loop and closed loop tracking of said head.

3. A blanking circuit for a video disk player performing special playback by moving a head in the radial direction of a video disk and causing said head to jump over a plurality of tracks, said circuit comprising:

a demodulating circuit for demodulating a received video signal produced from said video disk;

control means responsive to a condition signal for generating an elimination control signal; and eliminating means responsive to said elimination control signal for eliminating all image data contained in said demodulated video signal produced by said demodulating circuit, wherein said eliminating means comprises a switch, controlled by said control means, connected between a fixed potential and a diode, said diode being connected to a point on an electrical path between an input and an output of said eliminating means.

4. A method of blanking an image signal recorded on a video disk, comprising:

demodulating a video signal containing an image signal;

determining when signals recorded on adjacent tracks of said video disk are not correlated and when a head tracing said tracks is under open loop control; and responsive to said determining step, eliminating said image signal from said demodulated video signal.

5. A method as recited in claim 4, wherein said eliminating step further comprises clamping said image signal to a black level.

6. A method as recited in claim 4, wherein said adjacent tracks each extend in a generally circumferential direction of said disk and are adjacent one another in a radial direction of said disk.

7. A blanking circuit for a video disk player performing special playback by moving a head in the radial direction of a disk and causing said head to jump over a plurality of tracks, said circuit comprising:

a demodulating circuit for demodulating a received video signal;

an eliminating means for preventing said video signal produced by said demodulating circuit from being outputted; and control means for controlling said eliminating means, said control means inhibiting said eliminating means when synchronizing signals in video format signals on adjacent tracks of said video disk are correlated.

8. A blanking circuit as recited in claim 7, wherein said adjacent tracks each extend in a generally circumferential direction of said disk and are adjacent one another in a radial direction of said disk.

9. A blanking circuit for a video disk player performing special playback by moving a head in the radial direction of a video disk and causing said head to jump over a plurality of tracks, said circuit comprising:

a demodulating circuit for demodulating a received video signal produced from said video disk;

an eliminating circuit for preventing said video signal produced by said demodulating circuit from being outputted; and control means receiving an indicating signal indicating whether said disk is a constant linear velocity (CLV) or constant angular velocity (CAV) disk and responsive to said indicating signal for controlling said eliminating circuit, said control means inhibiting said eliminating circuit when said indicating signal indicates that said video disk is a constant angular velocity disk.

* * * * *